(No Model.)
S. McNICHOLL.
HARNESS SADDLE TREE.
No. 433,207. Patented July 29, 1890.
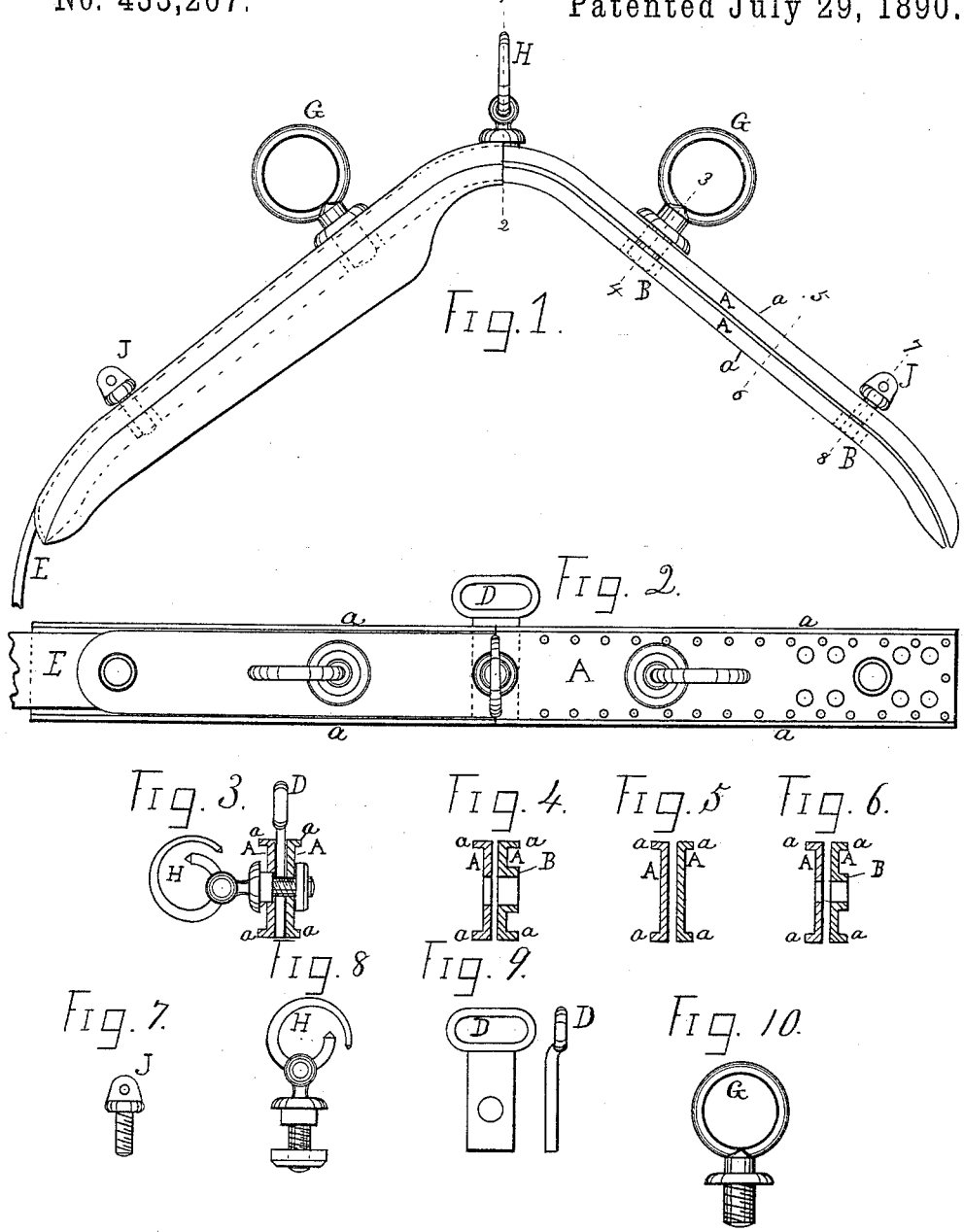

UNITED STATES PATENT OFFICE.

SAMUEL McNICHOLL, OF PHILADELPHIA, PENNSYLVANIA.

HARNESS-SADDLE TREE.

SPECIFICATION forming part of Letters Patent No. 433,207, dated July 29, 1890.

Application filed September 5, 1889. Serial No. 323,055. (No model.)

*To all whom it may concern:*

Be it known that I, SAMUEL MCNICHOLL, a citizen of the United States, residing at Germantown, county of Philadelphia, and State of Pennsylvania, have invented a new and useful Improvement in Harness-Saddle Trees, of which the following is a specification.

My invention relates to the "saddle-tree" or frame upon which harness-saddles are constructed.

The object of my improvement is to construct a metal saddle-tree that will be light, yet strong, good shape, and low cost.

My improvement consists in making the frame of two parts, with flanges so constructed that when put together the flanges will be opposite to each other, as shown in the accompanying drawings, making a part of this specification, in which—

Figure 1 is an edge view of a saddle-tree constructed according to my invention. One half is covered and padded. Fig. 2 is a top view of Fig. 1. Fig. 3 is a cross-section of Fig. 1 on dotted line 1 2. Fig. 4 is a cross-section of Fig. 1 on dotted line 3 4. Fig. 5 is a cross-section of Fig. 1 on dotted line 5 6. Fig. 6 is a cross-section of Fig. 1 on dotted line 7 8. Fig. 7 is a view of an eye-screw for holding the frame together and connecting the girth-strap to the saddle-tree. Fig. 8 is a view of the check-hook. Fig. 9 is a view of the crupper-loop. Fig. 10 is a view of one of the terret-rings.

Similar letters indicate corresponding parts.

A represents the frame of the saddle-tree, which is made in two parts and has flanges *a a* along the edges, as shown in sections 3, 4, 5, and 6. The top part has a number of small holes, as shown, on the uncovered part of Fig. 2. The under part is made with bosses B B. (Shown in sections 4 and 6 and by dotted lines, Fig. 1.) These bosses are drilled and tapped with a screw for screws J and terret-rings G.

The parts A A may be made of any suitable material; but I prefer to make them of malleable iron and lacquer them. If desired, they may be galvanized.

The crupper-loop D is made of a separate piece, and is fastened in the frame by the fastening which holds the check-hook to the frame, as shown in Fig. 3. By this arrangement, if the crupper-loop gets broken a new one can be put in without any trouble and at little expense.

The upper and lower parts A A are covered with leather, the lower parts padded, as shown in Fig. 1 on the left-hand part. The two parts A A are put together and held by the screws J, terret-rings G, and check-hook H. The girth-strap E is fastened to the saddle-tree by the screws J, as shown on the left hand of Figs. 1 and 2.

Having as above fully described my invention, what I claim, and desire to secure by Letters Patent, is—

In a harness-saddle frame, the combination of the plates A A, each having oppositely-projecting flanges at each edge thereof, substantially as shown and described, each of the plates provided with holes for the terret-shanks and with holes near the edges, by which the plates are secured together, substantially as and for the purpose specified.

SAML. McNICHOLL.

Witnesses:
JOHN SHIM,
CHARLES H. WEISS.